United States Patent [19]
Kijima

[11] Patent Number: 5,822,201
[45] Date of Patent: Oct. 13, 1998

[54] DOUBLE-ENDED INVERTER WITH BOOST TRANSFORMER HAVING OUTPUT SIDE IMPEDANCE ELEMENT

[75] Inventor: Seiichi Kijima, Oota-ku, Japan

[73] Assignee: Kijima Co., Ltd., Tokyo, Japan

[21] Appl. No.: 600,434

[22] Filed: Feb. 13, 1996

[30] Foreign Application Priority Data

Mar. 6, 1995 [JP] Japan ................................. 7-070414

[51] Int. Cl.⁶ .................................................. H02M 3/335
[52] U.S. Cl. ................. 363/25; 315/DIG. 5; 315/DIG. 7
[58] Field of Search ................................. 363/24, 25, 26; 315/DIG. 7, DIG. 5, 278

[56] References Cited

U.S. PATENT DOCUMENTS

| | | | |
|---|---|---|---|
| 4,101,806 | 7/1978 | Alley | 315/278 |
| 4,464,606 | 8/1984 | Kane | 315/DIG. 7 |
| 4,873,471 | 10/1989 | Dean et al. | 315/DIG. 7 |
| 5,359,274 | 10/1994 | Bandel | 315/DIG. 7 |
| 5,406,174 | 4/1995 | Slegers | 315/DIG. 7 |
| 5,557,176 | 9/1996 | O'Brien | 315/DIG. 7 |
| 5,586,016 | 12/1996 | Konopka et al. | 315/DIG. 7 |

*Primary Examiner*—Peter S. Wong
*Assistant Examiner*—Derek J. Jardieu
*Attorney, Agent, or Firm*—Loeb & Loeb LLP

[57] ABSTRACT

Here is disclosed a push-pull inverter characterized by a thin and small-sized boosting transformer improved to require a dielectric strength as low as possible and to be free from leakage current as well as noise. To realize such improvement, the boosting transformer is provided with a first secondary coil and a second secondary coil between which an impedance element such as a capacitor is connected so as to form together a serial circuit section, an output side of the first secondary coil is connected in a manner to have a same potential as a negative potential of a DC source and a load such as a fluorescent lamp is connected to the respective output sides of the first and second secondary coils.

12 Claims, 7 Drawing Sheets

DOUBLE-ENDED INVERTER WITH BOOST TRANSFORMER HAVING OUTPUT SIDE IMPEDANCE ELEMENT

BACKGROUND OF THE INVENTION

1. Technical Field

The present invention relates to a push-pull inverter used as a driver for cold-cathode discharge tube, hot-cathode discharge tube serving as so-called semihot, etc.

2. Background Art

Figure 6:
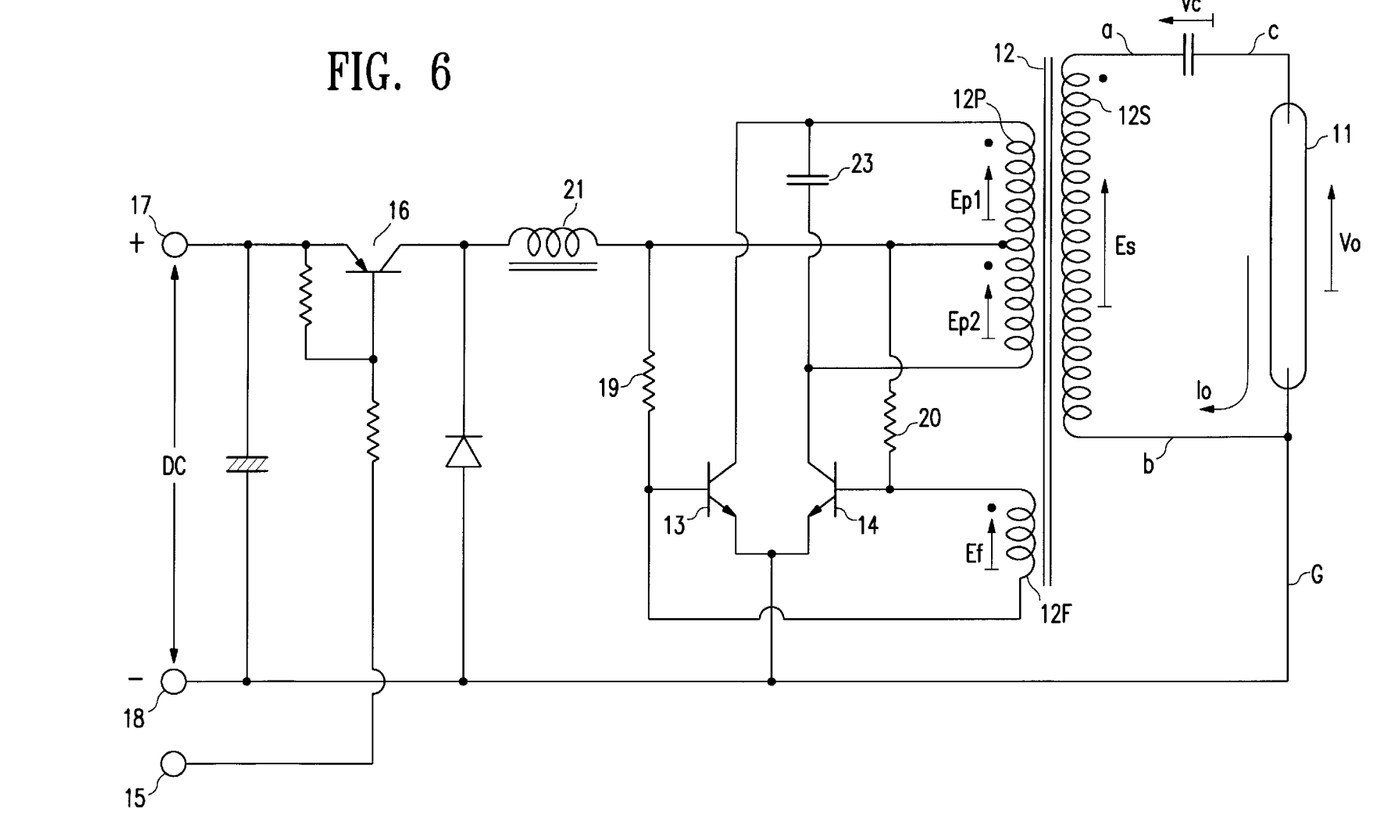
FIG. 6 is a circuit diagram showing an inverter of prior art.

FIG. 6 illustrates a conventional embodiment of the push-pull inverter constructed as the driver for a fluorescent lamp 11.

This inverter is provided with a push-pull inverter circuit substantially comprising a boosting transformer 12 and switching transistors 13, 14.

Upon application of a starting signal of low level from a terminal 15, a transistor 16 serving as a source switch is turned ON and supplied with DC power from a DC source connected to terminals 17, 18.

Then, the transistors 13, 14 are supplied through starting resistors 19, 20, respectively, with their base current. Though both the transistors 13, 14 are consequently switched to their conductive states, they are different from each other in transistor characteristic and circuit arrangement so that one of them becomes more positively conductive than the other and said one transistor is turned ON earlier than the other.

For example, when the transistor 14 is turned ON earlier than the transistor 13, the current supplied from the DC source passes through a choke coil 21 into a primary coil (input coil) 12P of the transformer 12 at a center tap of said primary coil 12P and this primary coil 12P generates thereacross the voltages Ep1, Ep2 of direction as indicated by arrows in FIG. 6.

Since, at this time point, a tertiary coil (feedback coil) 12F generates thereacross voltage Ef of a direction as indicated by an arrow in FIG. 6, the base of the transistor 14 is affected by a positive feedback effect and the collector current of this transistor 14 rapidly increases.

Thereupon, a secondary coil (output coil) 12S generates thereacross inductive voltage of a direction as indicated by an arrow in FIG. 6, which is applied as output voltage Es from the transistor 12 to the fluorescent lamp 11 to initiate lighting of this fluorescent lamp 11.

It should be understood that the fluorescent lamp 11 is applied with tube voltage Vo and a ballast capacitor 22 generates thereacross charging voltage Vc.

Since increase in the current flowing through the transistor 14 is suppressed at a saturation point which depends upon a base current as well as an amplification degree, the voltage of a direction opposed to that as indicated by an arrow in FIG. 6 is generated across the primary coil 12P of the boosting transformer 12 and the transistor 14 is switched from ON to OFF while the transistor 13 is switched from OFF to ON, as said increase in the current is reduced.

When the transistor 13 is turned ON, the voltage of a direction opposed to that as indicated by an arrow in FIG. 6 is generated across the tertiary coil 12F and consequently the transistor 13 is affected by the positive feedback and the current flowing through the transistor 13 increases, resulting in that the inductive voltage of a direction opposed to that as indicated by an arrow in FIG. 6 is generated across the secondary coil 12S, which maintains lighting of the fluorescent lamp 11.

Thereafter alternate turning-ON of the transistors 13, 14 repeatedly occurs in the same manner as has been mentioned above, generating a high AC voltage across the secondary coil 12S.

It should be understood that a reference numeral 23 designates a resonant capacitor connected in parallel to the primary coil 12P in order to generate sine wave voltage.

Figure 7:
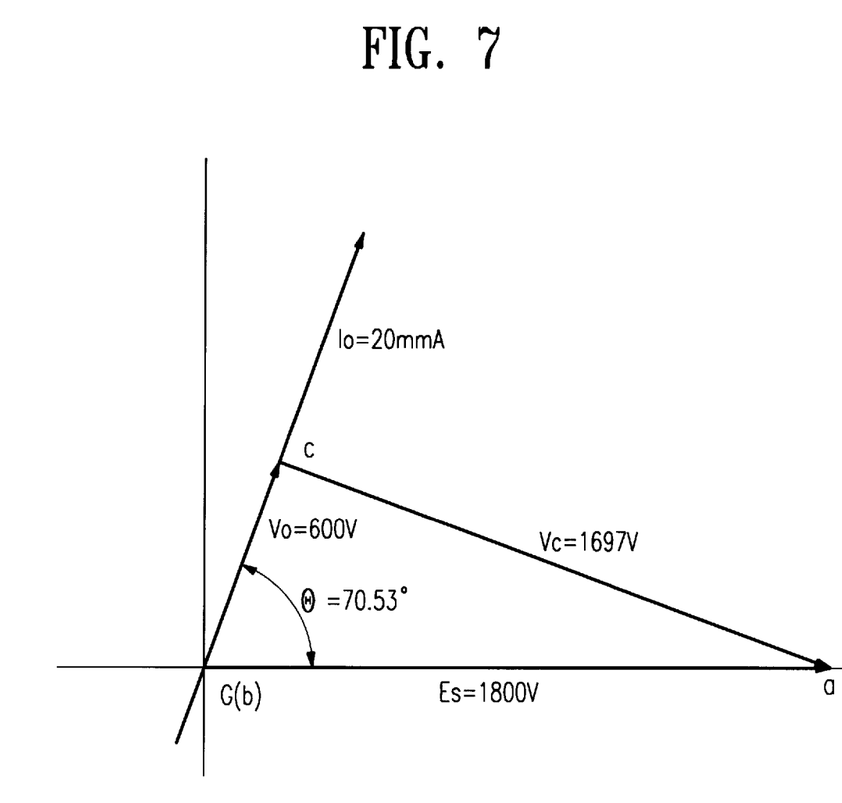
FIG. 7 is a vector diagram illustrating transformer output voltage, tube voltage and coupling capacitor voltage in said inverter of prior art.

FIG. 7 is a vector diagram illustrating a relationship established among the transformer output voltage Es, the tube voltage Vo of the fluorescent lamp and the ballast capacitor voltage Vc during operation of said inverter under conditions as specified below:

Transformer output voltage Es=1800V (effective value) (Peak-to-peak voltage Ep–p=5091V)

Tube voltage Vo=600V (effective value)

Tube current Io=20 mmA (effective value)

Tube power Wo=12 W

Ballast capacitor voltage Vc=1697 V (effective value) (39.9 pF)

Output voltage frequency f=47 kHz

Tube current phase angle θ=70.50°

As will be apparent from this vector diagram, Es=Vo+Vc (It should be noted that this is a vector addition equation).

Said boosting transformer 12 is provided in the form of a miniaturized transformer comprising the primary coil 12P, the secondary coil 12S and the tertiary coil 12F lap-wound around a winding drum of a bobbin, a ferrite core partially inserted into said winding drum and terminal pins planted on the bobbin to which the respective coil ends are fixed by means of soldering or the like.

The inverter of such type is often used as a back light power supply for a display provided in word processor, personal computer or the like and, accordingly, the boosting transformer for such inverter is necessarily required to be as thin as possible.

Recently, considerably thinner boosting transformers have been developed and proposed. However, thinning as well as miniaturizing of the boosting transformer is limited by a problem such that a high DC output voltage (e.g., 600 to 3000 volts) required for such boosting transformer 12 inevitably makes a dielectric treatment difficult.

More specifically, in the boosting transformer 12 of the above-mentioned construction, the low voltage side of the secondary coil 12S (output coil) is at a zero volt and the high voltage side is at several thousand volts, so said dielectric treatment among the primary coil 12P, the tertiary coil 12F, the terminal pins and the ground becomes more and more difficult as a configuration of the transformer is thinned.

Additionally, the boosting transformer of prior art has disadavantageously been prone to be affected by not only by leakage current due to a distributed capacity of the transformer 12 but also by noise generated from various components such as the fluorescent lamp, respective parts of the high voltage side and the lead wire.

SUMMARY OF THE INVENTION

In view of the stand of art as has previously been described, it is an object of the invention to develop a push-pull inverter allowing a boosting transformer to have a dielectric strength as low as possible so as to facilitate a configuration of the transformer to be thinned and miniaturized and allowing leakage current as well as noise to be effectively avoided.

The object set forth above is achieved, in accordance with the invention, by a push-pull inverter having a boosting transformer and serving to boost an input voltage from a DC source and to convert it to AC voltage, said push-pull inverter being characterized by said boosting transformer provided with a first output coil and a second output coil between which an impedance element is connected so as to form together a serial circuit, wherein an output side of said first or second output coil is connected so as to have a same potential as a negative potential of the DC source and a load is connected to respective output sides of said first and second coils.

In said inverter, a sum of inductive voltages generated across the respective output coil sections is used as a total output voltage.

Consequently, the dielectric treatment may be made not against a high voltage of the output coil but against the voltage generated across each output coil section which is sufficiently lower than the voltage against which the dielectric treatment has conventionally been required.

In addition, both the leakage current and the noise current can be minimized, since the distributed capacity of the boosting transformer as well as the noise generated from the high voltage side depend on the inductive voltages generated across the first and second output coils, respecitvely.

This is very advantageous to thin and miniaturize the boosting transformer.

BRIEF DESCRIPTION OF THE DRAWINGS

The invention will be described by way of example in reference with the accompanying drawings, in which.

DESCRIPTION OF THE PREFERRED EMBODIMENTS

Figure 1:
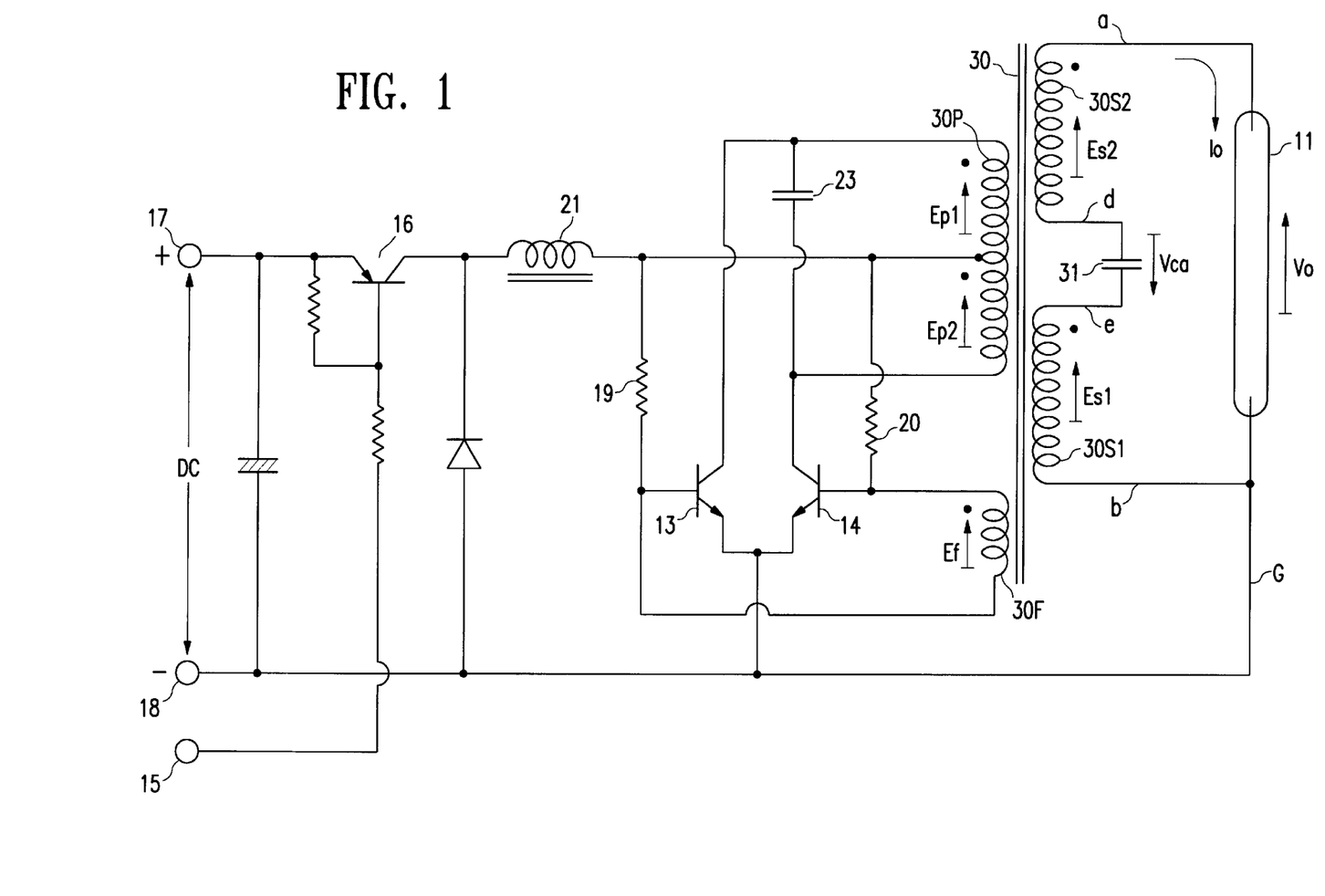
FIG. 1 is a circuit diagram showing a first embodiment of the inverter constructed according to the invention.

FIG. 1 is a circuit diagram showing a first embodiment of the invention in the form of a driver for fluorescent lamp and this embodiment is characterized by a boosting transformer 30. Rest of the circuit arrangement is similar to the well known inverter circuit as shown by FIG. 6 and therefore the components similar to those in the well known inverter circuit will be designated by similar reference numerals.

As shown, the boosting transformer 30 comprises a primary coil 30P, a first secondary coil 30S1, a second secondary coil 30S2 and a tertiary coil 30F.

In this boosting transformer 30, the first secondary coil 30S1 and the second secondary coil 30S2 both functioning as output coils are coupled to each other by a coupling capacitor 31 so that these output coils 30S1, 30S2 may form together with the capacitor 31 a serial circuit section.

In the above-mentioned boosting transformer 30, a fluorescent lamp 11 is connected to an output side b of the output coil 30S1, on one hand, and to an output side a of the output coil 30S2, on the other hand, wherein said output side b of the output coil 30S1 is connected so as to have a same potential (ground G) as a negative potential of a DC source.

Oscillation of the inverter constructed as has been described above causes the first and second secondary coils 30S1, 30S2 of the boosting transformer 30 to generate inductive voltages Es1, Es2, respectively, and a sum of these inductive voltages Es1, Es2 is used as a total output voltage Es.

Figure 2:
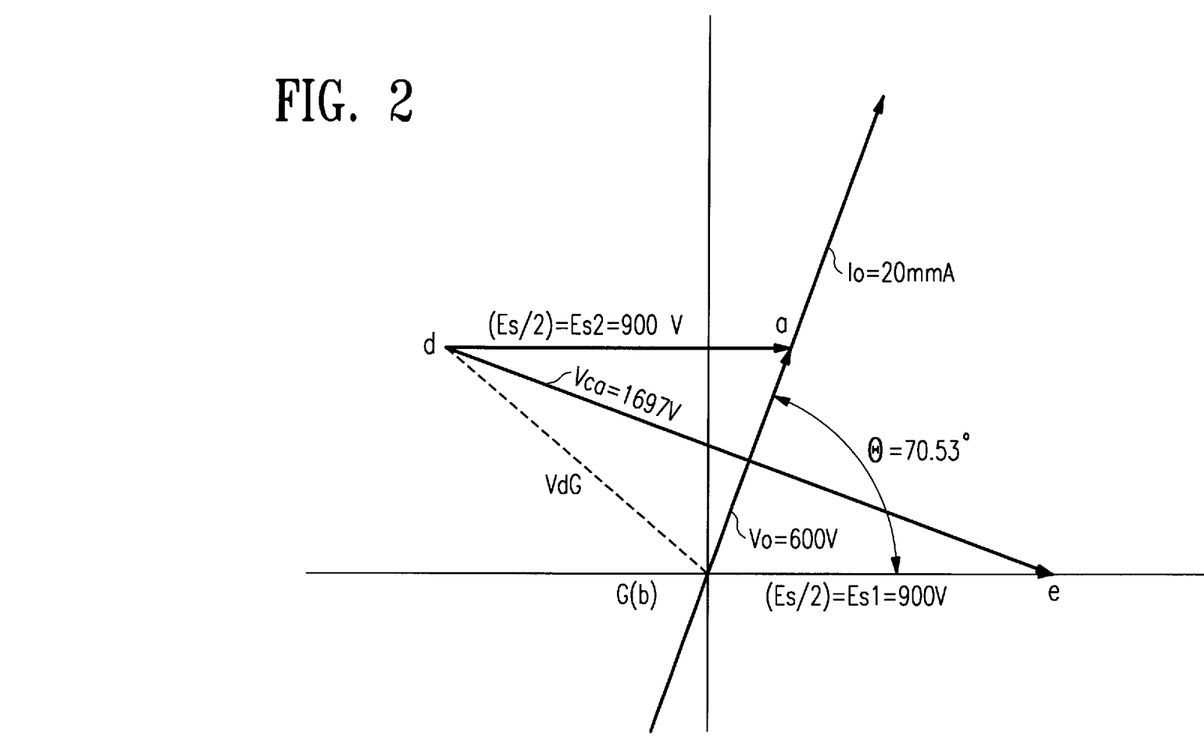
FIG. 2 is a vector diagram illustrating transformer output voltage, tube voltage and coupling capacitor voltage in said first embodiment of the inverter.

FIG. 2 is a vector diagram illustrating respective voltages generated as the present embodiment of the inveter operates under conditions as specified below:

Total output voltage Es of the transformer=1800V (effective value) (Peak-to-peak voltage Ep–p=5091 V)

Output voltage Es1 of the first secondary coil 30S1=900 V (effective value)

Output voltage Es2 of the second secondary coil 30S2= 900 V (effective value)

Tube voltage Vo=600 V (effective value)

Tube current Io=20 mmA (effective value)

Tube power Wo=12 W

Coupling capacitor voltage Vca=1697 V (effective value), (39.9pF)

Output voltage frequency f=47 kHz

Tube current phase angle θ=70.53°

As will be readily understood from this vector diagram, both the output voltage Es1 of the first secondary coil 30S1 and the output voltage Es2 of the second secondary coil 30S2 function as an electromotive voltage while both the fluorescent lamp 11 and the coupling capacitor 31 function as a load, so Es1+Es2=Vo+Vca and therefore (Es/2)+(Es/2) =Vo+Vca (It should be understood that these are vector addition equations).

In this manner, the coupling capacitor 31 functions to halve the output voltage and at the same time functions as a ballast capacitor.

Thus, here is established a relationship expressed by Es1=Es2=900 V (Vp–p=2545.5 V) which means that a dielectric strength required for insulation of the transformer may be reduced by half relative to the dielectric strength which has been required by the embodiment of prior art.

As a result, an arrangement for dielectric treatment can be simplified and thereby a configuration of the transformer can be effectively thinned and miniaturized without leakage current due to the distributed capacity as well as noise generated from the high voltage section.

So far as it is not pursued to obtain an extremely thinned and small-sized configuration of the transformer, the respective output coil voltages, i.e., the total output voltage Es can be set at a sufficiently high level to use the inverter as the driver for the fluorescent lamp of high tube voltage.

Figure 3:
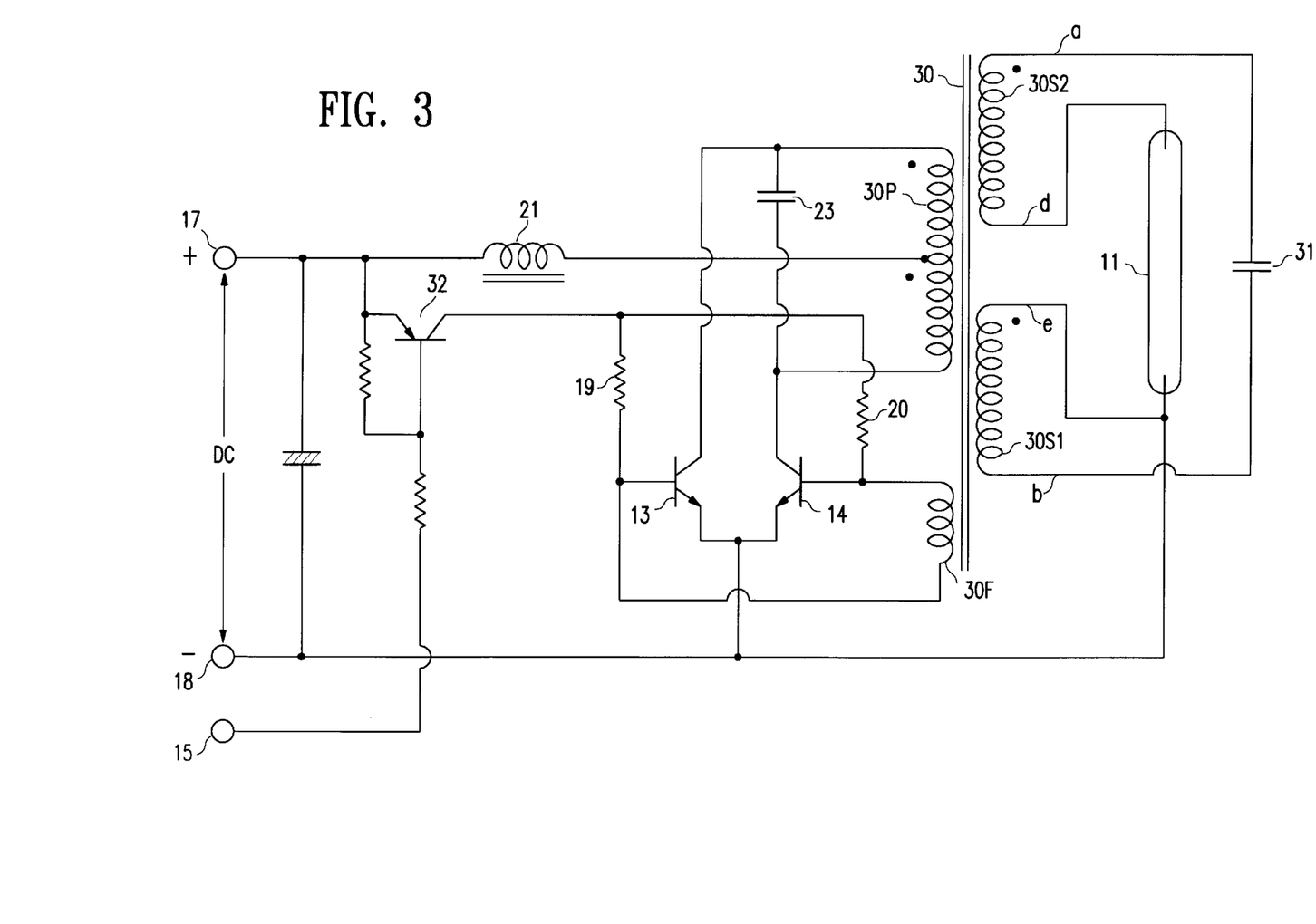
FIG. 3 is a circuit diagram showing a second embodiment of the inverter constructed according to the invention.

FIG. 3 is a circuit diagram showing a second embodiment of the inventive inverter, in which the fluorescent lamp 11 is connected between an end d of the first secondary coil 30S1 and an end e of the second secondary coil 30S2 while the coupling capacitor 31 is connected between the other ends a and b of these secondary coils 30S1, 30S2.

There is provided a starting transistor 32 so that the bases of the switching transistors 13, 14 may be supplied with starting current upon turning-ON of said starting transistor 32.

Rest of the circuit arrangement is similar to the first embodiment.

This second embodiment operates in the same manner as the first embodiment and therefore its manner of operation will not be described here.

Figure 4:
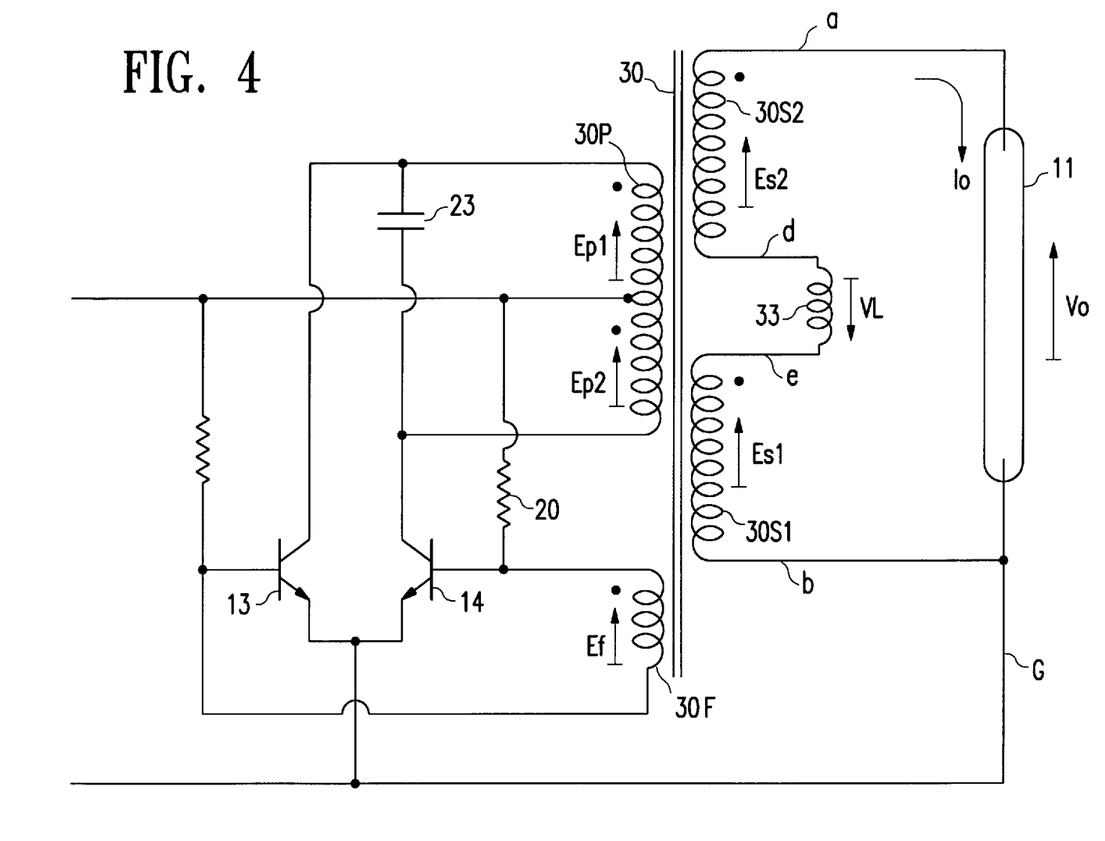
FIG. 4 is a partial circuit diagram showing a third embodiment of the inverter constructed according to the invention.

FIG. 4 is a partial circuit diagram showing a third embodiment of the inventive interter, in which the first secondary coil 30S1 is connected to the second secondary coil 30S2 by a coil element 33. Rest of the circuit arrangement is similar to the inverter circuit shown by FIG. 1.

Figure 5:
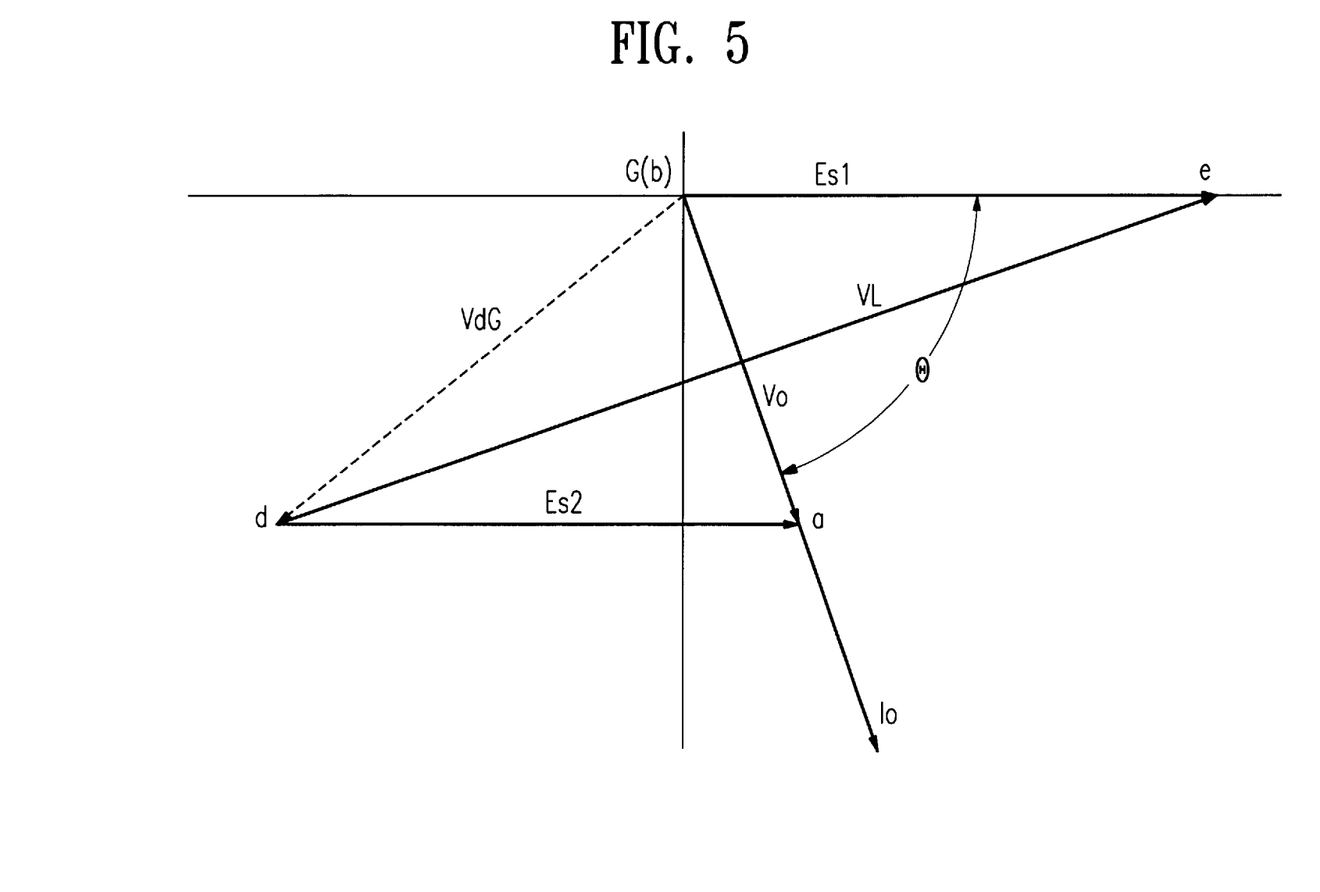
FIG. 5 is a vector diagram illustrating transformer output voltage, tube voltage and coupling capacitor voltage in said third embodiment of the inverter.

According to this embodiment, the tube current Io lags relative to the output voltages Es1, Es2, so the output voltages Es1, Es2, the tube voltage Vo and the coil element voltage VL establish among them a relationship illustrated by a vector diagram of FIG. 5 and expressed by a vector addition equation Es1+Es2=Vo+VL.

In consequence, the previously mentioned relationship expressed by (Es/2)+(Es/2)=Vo+VL (vector addition equation) is established also in this embodiment and the same effect as obtained by the previously mentioned first and second embodiments can be obtained also by this third embodiment.

While the invention has been described hereinabove with respect to several specific embodiments, it is also possible without departing from the scope of the invention to connect the first secondary coil 30S1 to the second secondary coil 30S2 of the boosting transformer 30 by a resistor element so far as more or less decrease of the inverter efficiency is tolerated.

It should be also understood that the boosting transformer 30 is not limited to the arrangement providing Es1=Es2 but may be alternatively arranged so as to provide Es1>Es2 or vice versa.

When the inverter of the invention is used as the driver for a lighting discharge tube as in the above-mentioned embodiments, this inverter can be used also as a dimmer by changing a duty ratio of pulses provided from the terminal 15.

Furthermore, it is unnecessary to modify the basic arrangement of the inverter depending on the associated load which may be resistive load such as fluorescent lamp or inductive or capacitive load.

What is claimed is:

1. Push-pull inverter having a boosting transformer and serving to boost an input voltage from a DC source and to convert it to AC voltage, said push-pull inverter being characterized by said boosting transformer provided with a first output coil and a second output coil between which an impedance element is connected so as to form together a serial circuit section, wherein an output side of said first or second output coil is connected so as to have a same potential as a negative potential of the DC source and a load is connected to respective output sides of said first and second output coils.

2. Push-pull inverter according to claim 1, wherein any one of capacitor, coil and resistor is connected between said first and second output coils as said impedance element.

3. Push-pull inverter according to claim 1, wherein a fluorescent lamp is connected to output sides of said first and second output coils as said load.

4. Push-pull inverter according to claim 1 wherein the output sides of said first and second output coils are remote from said impedance element.

5. Push-pull inverter according to claim 1 wherein the load is connected only to the output sides of said first and second output coils.

6. Push-pull inverter according to claim 1 wherein each of said first and second output coils further has a second side connected directly to said impedance element and connected only to said impedance element.

7. Push-pull inverter according to claim 1, comprising an input coil having a center tap, said boosting transformer provided with said first and second output coils, a first transistor adapted for switching input current flowing through said center tap into one side of said input coil, a second transistor adapted for switching input current flowing through said center tap into the other side of said input coil, a capacitor connected between said first and second output coils, and a fluorescent lamp connected to the respective output sides of said first and second output coils.

8. Push-pull inverter according to claim 7, wherein said push-pull inverter functions also as a dimmer of the fluorescent lamp by operating said first and second transistors with pulses having a duty ratio adjustably varied.

9. Push-pull inverter according to claim 1 wherein the serial circuit section is connected for producing a high voltage which is applied to the load as the AC voltage.

10. Push-pull inverter according to claim 9 wherein the output sides of said first and second output coils are remote from said impedance element.

11. Push-pull inverter according to claim 10 wherein the load is connected only to the output sides of said first and second output coils.

12. Push-pull inverter according to claim 11 wherein each of said first and second output coils further has a second side connected directly to said impedance element and connected only to said impedance element.

* * * * *